United States Patent
Bujnowski et al.

(10) Patent No.: US 11,216,497 B2
(45) Date of Patent: Jan. 4, 2022

(54) METHOD FOR PROCESSING LANGUAGE INFORMATION AND ELECTRONIC DEVICE THEREFOR

(71) Applicant: Samsung Electronics Co., Ltd., Suwon-si (KR)

(72) Inventors: Pawel Bujnowski, Warsaw (PL); Dawid Wisniewski, Wagrowiec (PL); Hee Sik Jeon, Yongin-si (KR); Joanna Ewa Marhula, Warsaw (PL); Katarzyna Beksa, Kobylka (PL); Maciej Zembrzuski, Poznan (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 16/493,667

(22) PCT Filed: Mar. 13, 2018

(86) PCT No.: PCT/KR2018/002920
§ 371 (c)(1),
(2) Date: Sep. 12, 2019

(87) PCT Pub. No.: WO2018/169276
PCT Pub. Date: Sep. 20, 2018

(65) Prior Publication Data
US 2020/0004768 A1    Jan. 2, 2020

(30) Foreign Application Priority Data
Mar. 15, 2017 (KR) .................. 10-2017-0032637

(51) Int. Cl.
*G06F 40/284* (2020.01)
*G06F 16/332* (2019.01)
(Continued)

(52) U.S. Cl.
CPC ......... *G06F 16/3329* (2019.01); *G06F 3/167* (2013.01); *G06F 16/3344* (2019.01);
(Continued)

(58) Field of Classification Search
CPC ............ G06F 16/3329; G06F 16/3344; G06F 40/284; G06F 40/30; G06F 3/167;
(Continued)

(56) References Cited

U.S. PATENT DOCUMENTS 6,125,341 A    9/2000   Raud et al.
8,024,179 B2   9/2011   Pulz et al.
(Continued)

FOREIGN PATENT DOCUMENTS

JP    2005-031150 A    2/2005
KR    10-0855563 B1    9/2008
(Continued)

OTHER PUBLICATIONS

ISA/KR, International Search Report and Written Opinion of the International Searching Authority, International Application No. PCT/KR2018/002920, dated Jun. 28, 2018, 12 pages.
Moynihan, Tim, "This Toy Dinosaur Uses IBM's Watson as a Brain," Wired, Aug. 5, 2015, 2 pages.
(Continued)

*Primary Examiner* — Charlotte M Baker

(57) ABSTRACT

The disclosure relates to an artificial intelligence (AI) system for simulating human brain functions such as perception and judgement by using a machine learning algorithm such as deep learning, and an application thereof. An operation method of an electronic device comprises the steps of: receiving an input message; determining a user's language information included in the input message; determining language information for a response corresponding to the user's language information; and outputting the response on the basis of the language information for the response.

16 Claims, 8 Drawing Sheets

(51) Int. Cl.
*G06N 20/00* (2019.01)
*G06F 16/33* (2019.01)
*G06F 40/30* (2020.01)
*G06F 3/16* (2006.01)
*G06N 3/08* (2006.01)
*G10L 15/22* (2006.01)

(52) U.S. Cl.
CPC ............ *G06F 40/284* (2020.01); *G06F 40/30* (2020.01); *G06N 3/08* (2013.01); *G06N 20/00* (2019.01); *G10L 15/22* (2013.01); *G10L 2015/228* (2013.01)

(58) Field of Classification Search
CPC . G06F 16/90332; G06F 40/253; G06N 20/00; G06N 3/08; G06N 3/0445; G10L 15/22; G10L 2015/228; G10L 15/26
USPC ..... 704/9, 2, 10, 3, 270.1, 270, 4, 275, 255, 704/254, 231, E15.001, E15.005
See application file for complete search history.

(56) References Cited

U.S. PATENT DOCUMENTS

| | | |
|---|---|---|
| 8,457,967 B2 | 6/2013 | Audhkhasi et al. |
| 2012/0156660 A1 | 6/2012 | Kwon et al. |
| 2017/0011735 A1 | 1/2017 | Kim et al. |
| 2017/0221471 A1* | 8/2017 | Sharifi ................... G10L 13/00 |
| 2017/0345426 A1* | 11/2017 | Komissarchik ......... G10L 15/07 |

FOREIGN PATENT DOCUMENTS

| | | |
|---|---|---|
| KR | 10-2012-0075585 A | 7/2012 |
| KR | 10-1677630 B1 | 11/2016 |
| KR | 10-2017-0007107 A | 1/2017 |
| KR | 10-2017-0007852 A | 1/2017 |

OTHER PUBLICATIONS

Notice of Preliminary Rejection dated Jul. 14, 2021 in connection with Korean Patent Application No. 10-2017-0032637, 11 pages.

* cited by examiner

METHOD FOR PROCESSING LANGUAGE INFORMATION AND ELECTRONIC DEVICE THEREFOR

CROSS-REFERENCE TO RELATED APPLICATIONS

This application is a 371 National Stage of International Application No. PCT/KR2018/002920 filed Mar. 13, 2018, which claims priority to Korean Patent Application No. 10-2017-0032637, filed Mar. 15, 2017, the disclosures of which are herein incorporated by reference in their entirety.

BACKGROUND

1 Field

Various embodiments of the disclosure relate to a method and an electronic device for processing language information.

2. Description of Related Art

An artificial intelligence (AI) system is a computer system that implements human-level intelligence, and, unlike existing rule-based smart systems, is a system in which the machine learns, judges, and becomes smarter. The artificial intelligence system achieves a higher recognition rate and more accurately understands the preferences of the user the more it is used, so that existing rule-based smart systems are gradually being replaced by deep-learning-based artificial intelligence systems.

Artificial intelligence technology includes machine learning (deep learning) and element technology that utilizes machine learning.

Machine learning is an algorithm technique in which a machine classifies/learns the features of input data by itself. The element technology is intended to simulate human brain functions, such as perception, judgment, and the like, using machine-learning algorithms, such as deep learning, and includes techniques such as linguistic understanding, visual understanding, inference/prediction, knowledge representation, motion control, and the like.

Artificial intelligence technology may be applied to various fields, as follows. Linguistic understanding denotes a technique for recognizing, applying, and processing human language/characters and includes natural language processing, machine translation, dialogue system, query response, voice recognition/synthesis, and the like. Visual understanding denotes a technique for recognizing and processing objects as human vision, and includes object recognition, object racking, image searching, human recognition, scene understanding, spatial understanding, image enhancement, and the like. Inference and prediction denote a technique for judging information to thus perform logical inference and prediction, and include knowledge/probability-based inference, optimized prediction, preference-based planning, recommendation, and the like. Knowledge representation denotes a technique for automating human experience information into knowledge data and includes knowledge building (data generation/classification), knowledge management (data utilization), and the like. Motion control denotes a technique for controlling the autonomous travel of a vehicle and the motion of a robot, and includes motion control (navigation, collision, and traveling), operation control (behavior control), and the like.

With the development of voice recognition technology, there is growing interest in electronic devices capable of conducting conversations with users. Accordingly, the electronic device may provide an intelligent personal assistant service that recognizes the user's intention from the voice message and gives an appropriate answer. For example, when the user verbally asks an electronic device a question to, the electronic device may inform the user of contact information or a personal schedule, and may provide answers to the user's questions, pertaining, for example, to the weather or the like, based on the content found on the web.

SUMMARY

Based on the above description, the disclosure provides a method and an electronic device for processing language information.

In addition, the disclosure provides a method and an electronic device for determining language information of a user from an input message by the user.

In addition, the disclosure provides a method and an electronic device for determining language information for a response corresponding to the language information of the user.

Further, the disclosure provides a method and an electronic device for outputting a response according to the language proficiency level of a user.

According to various embodiments of the disclosure, an operation method of an electronic device may include: receiving an input message; determining language information of a user included in the input message; determining language information for a response corresponding to the language information of the user; and outputting the response, based on the language information for the response.

According to various embodiments of the disclosure, an electronic device may include: an input unit configured to receive an input message; and a processor configured to perform control so as to: determine language information of a user included in the input message; determine language information for a response corresponding to the language information of the user; and output the response, based on the language information for the response.

A method according to various embodiments of the disclosure and an electronic device thereof can adaptively output a response depending on a user's language proficiency.

Effects which can be acquired by the disclosure are not limited to the above described effects, and other effects that have not been mentioned may be clearly understood by those skilled in the art from the following description.

DETAILED DESCRIPTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

The disclosure relates to a method and an electronic device for processing language information of a user.

Terms referring to a language capability metric (e.g., a language proficiency level), terms referring to a message (e.g., a voice message or a text message), terms referring to the components of the device, and the like, inch are used herein, are only examples for the convenience of explanation. Accordingly,the disclosure is not limited to the terms used herein, and other terms having equivalent technical meanings may be used.

Figure 1:
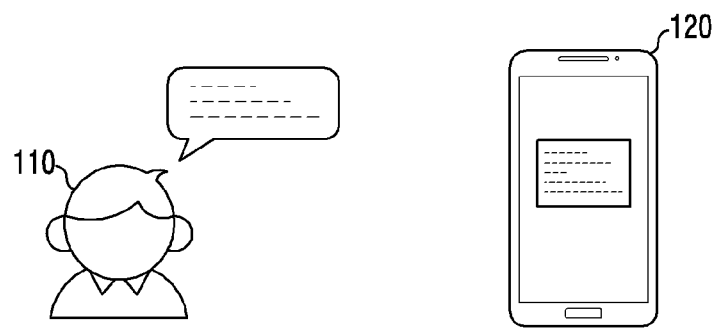
FIG. 1 illustrates the interaction between an electronic device and a user according to various embodiments of the disclosure

FIG. 1 illustrates the interaction between an electronic device and a user according to various embodiments of the disclosure.

Referring to FIG. 1, a user 110 and a terminal 120 may conduct a conversation. The user 110 may enter a message into the terminal 120. The terminal 120 may output a response to the input message. In this case, the terminal 120 may determine language information to be used in the response according to the language proficiency level of the user 110.

The terminal 120 may be referred to as "user equipment (UE)", a "mobile station", a "subscriber station", a "remote terminal", a "wireless terminal", a "user device", or any other term having an equivalent technical meaning, in addition to "terminal". In some cases, the terminal 120 may be a device that performs machine-type communication (MTC), and may not be carried by the user 110.

Figure 2:
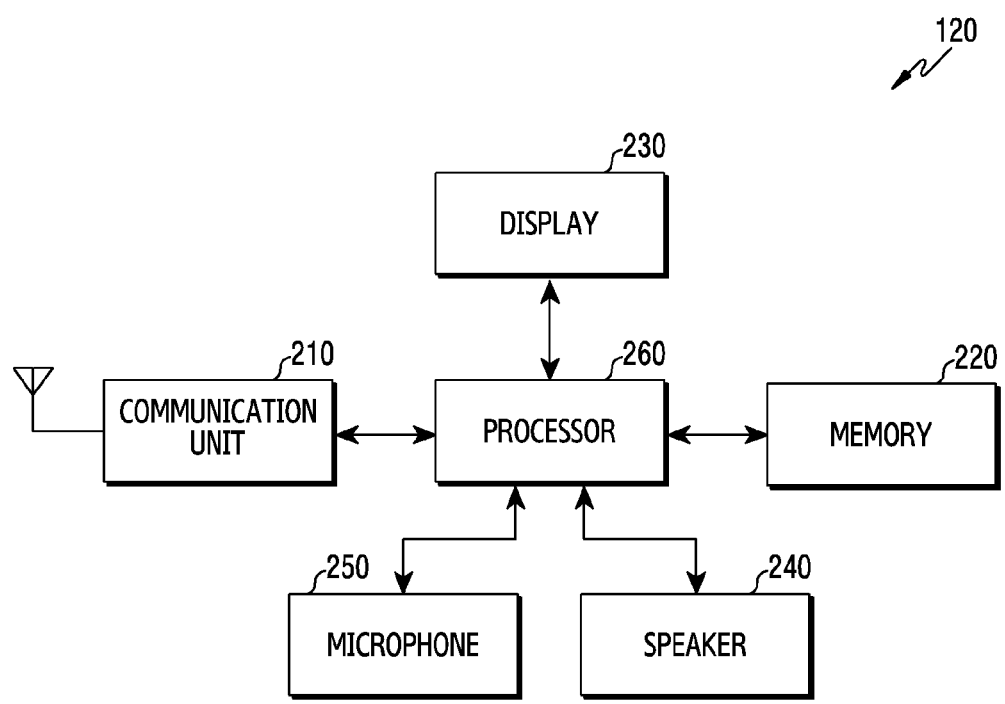
FIG. 2 illustrates an example of the functional configuration of an electronic device according to various embodiments of the disclosure.

FIG. 2 illustrates an example of the functional configuration of an electronic device according to various embodiments of the disclosure.

Referring to FIG. 2, the electronic device 120 may include a communication unit 210, a memory 220, a display 230, a speaker 240, a microphone 250, and a processor 260.

The communication unit 210 may receive a radio frequency (RF) signal. To this end, the communication unit 210 may include at least one antenna. The communication unit 210 may down-convert a received signal to produce an intermediate-frequency (IF) signal or a baseband signal. The communication unit 210 may include a reception processing circuit that produces a baseband signal processed by filtering, decoding, and/or digitizing a baseband or IF signal. The reception processing circuit may transmit the processed baseband signal to the speaker for voice data, or may transmit the same to the processor 260 for further processing (e.g., web browsing data). In addition, the communication unit 210 may include at least one transceiver. The at least one transceiver may receive outgoing baseband data (such as web data, e-mail, interactive video game data, and the like) from the processor 260. A transmission processing circuit may encode, multiplex, and digitize the outgoing baseband data to produce a processed baseband or intermediate-frequency signal. The communication unit 210 may up-convert the outgoing baseband or intermediate-frequency signal processed through the transmission processing circuit to an RF signal to be transmitted via an antenna.

The memory 220 may store data such as basic programs for the operation of the electronic device 120, application programs, and configuration information. The memory 220 may be configured as a volatile memory, a non-volatile memory, or a combination thereof. In addition, the memory 220 may provide the stored data according to a request by the processor 260.

The display 230 may be a liquid crystal display, a light-emitting diode display, or any other kind of display capable of displaying text and/or images. The display 230 may display a screen corresponding to the data received through the processor 260. The display 230 may be referred to as an "input unit" or some other term having an equivalent technical meaning.

The speaker 240 may convert n audio signal into vibration using the vibration of a diaphragm, thereby outputting the same into the air. The speaker 240 may output a response corresponding to the input message received from the user 110 in an analog form The microphone 250 may include a circuit such as a piezoelectric element, and may produce an audio signal using vibration of a diaphragm in response to a voice input to the microphone 250. The microphone 250 may receive a voice input from the user 110. The microphone 250 may be referred to as an "input unit" or some other term having an equivalent technical meaning.

The processor 260 may control the communication unit 210, the memory 220, the display 230, the speaker 240, and the microphone 250, which are operably connected to the processor 260. For example, the processor 260 may control the reception of a forward channel signal and the transmission of a reverse channel signal using the communication unit 210. In some embodiments, the processor 260 may include at least one microprocessor or microcontroller. The processor 260 may execute programs stored in the memory 220. The processor 260 may store or recall data in or from the electronic device 120 as required in the execution process. The processor 260 may be configured to execute an application in response to a received signal, based on an operating system.

In FIG. 2, although it has been illustrated that the electronic device 120 includes the communication unit 210, the memory 220, the display 230, the speaker 240, the microphone 250, and the processor 260, this is only an example. Thus, the device may further include other components, and some of the communication unit 210, the memory 220, the display 230, the speaker 240, the microphone 250, and the processor 260 described above may be omitted.

Figure 3:
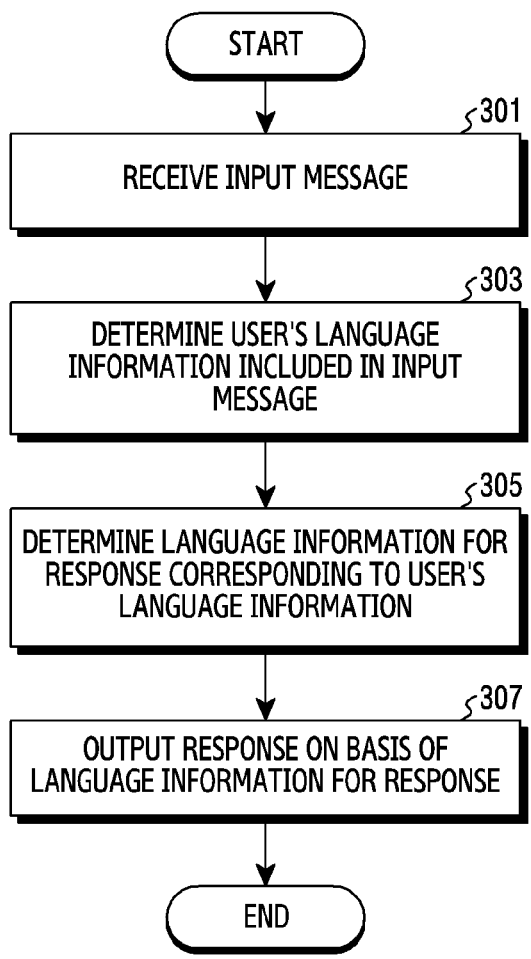
FIG. 3 illustrates an operation method for outputting a response according to a user's language capability in an electronic device according to various embodiments of the disclosure.

FIG. 3 illustrates an operation method for outputting a response according to a user's language capability in an electronic device according to various embodiments of the disclosure. FIG. 3 illustrates an operation method of the electronic device 120.

Referring to FIG. 3, the electronic device 120 receives an input message in step 301.

For example, the input message may be a voice (hereinafter, referred to as a "voice message"), which is input to the microphone 250 of the electronic device 120 by the user 110. As another example, the input message may be a text (hereinafter, referred to as a "text message") that the user 110 enters by pressing a button of the electronic device 120 or touching a touch screen (e.g., the display 230) of the electronic device 120.

In step 303, the electronic device 120 determines language information of the user 110 included in the input message. For example, the language information of the user 110 may include information about lexicon, grammar, syntax, intonation, stress, tone, and rhythm. In some embodiments, the electronic device 120 may determine the language proficiency level of the user 110, based on the language information of the user 110. For example, the electronic device 120 may determine the language proficiency level of the user according to the number of words included in the language information of the user 110. Here, the language proficiency level of the user 110 may indicate a value for representing the language proficiency of the user 110.

In step 305, the electronic device 120 determines language information for a response corresponding to the language information of the user 110. In some embodiments, the electronic device 120 may determine language information for a response corresponding to the language proficiency level of the user 110. Here, the language proficiency level of the user 110 may be a value for representing the language proficiency of the user 110. In addition, the language information for a response may be defined based on at least one of the number of usable grammatical forms/words, the type of grammatical form/word, and the length of a sentence. In other embodiments, the electronic device 120 may determine language information for a response, based on other language information of the user 110, which is included in another input message received before receiving the input message, and the language information included in the input message. In other embodiments, the electronic device 120 may detect an error in the language information of the user 110, and may determine language information for a response, based on the detected error.

In step 307, the electronic device 120 outputs a response, based on the language information for a response. For example, the response may include sound, text, photographs, and moving pictures. In some embodiments, if the language proficiency level of the user 110 is 0.5, the electronic device 120 may output a response configured as photographs. If the language proficiency level of the user 110 is 0.7, the electronic device 120 may output a response configured as moving pictures.

Figure 4:
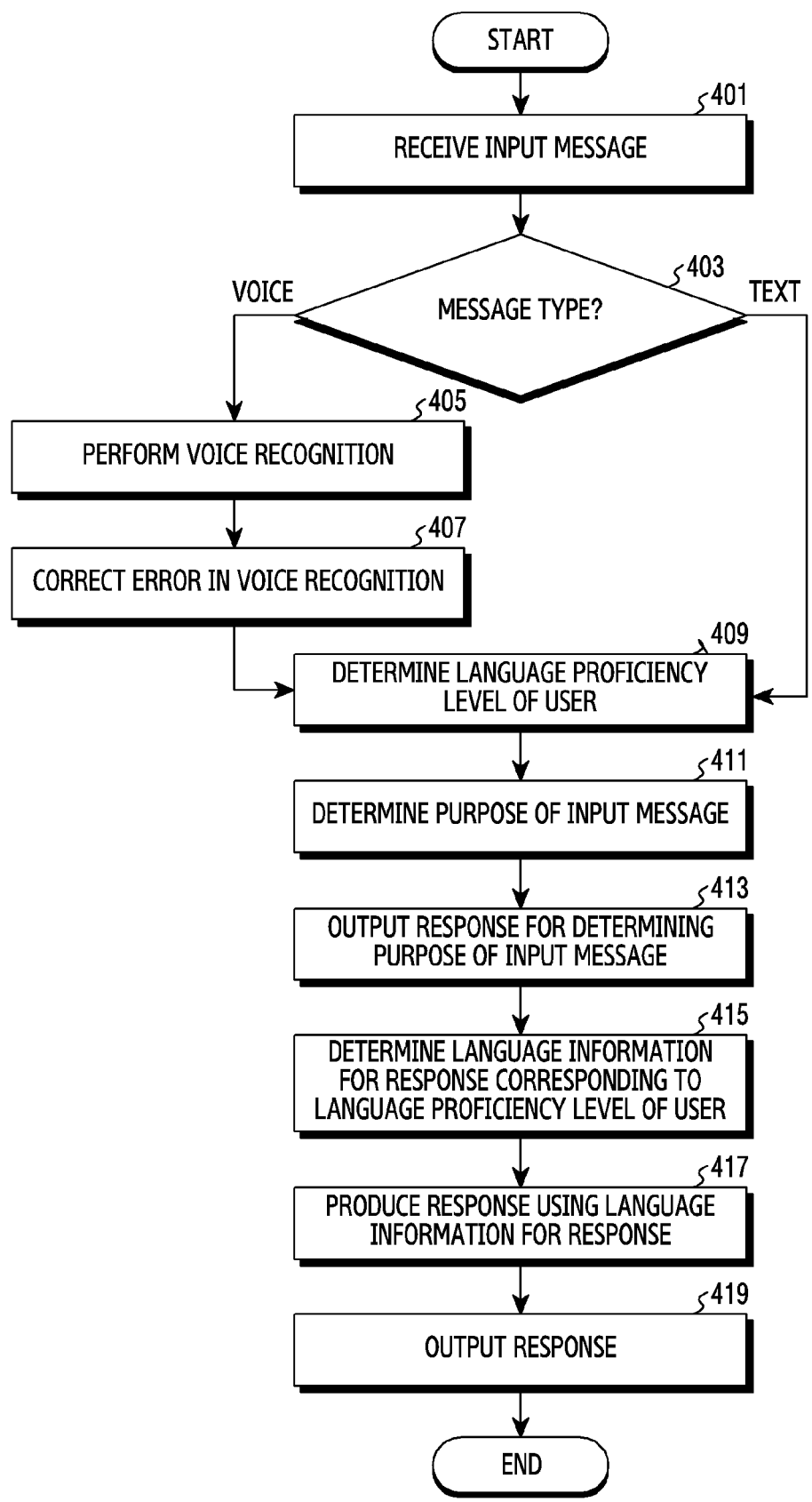
FIG. 4 illustrates another operation method for outputting a response according to a user's language capability in an electronic device according to various embodiments of the disclosure.

FIG. 4 illustrates another operation method for outputting a response according to a user's language capability in an electronic device according to various embodiments of the disclosure. FIG. 4 illustrates an operation method of the electronic device 120.

Referring to FIG. 4, the electronic device 120 receives an input message from the user 110 in step 401. Here, the input message may be a voice message or a text message.

In step 403, the electronic device 120 determines the type of input message. That is, the electronic device 120 determines whether the input message is a voice message or a text message. If the input message is a text message, the electronic device 120 proceeds to step 409.

On the other hand, if the input message is a voice message, the electronic device 120 performs voice recognition on the voice message in step 405. That is, the electronic device 120 produces language information from the voice message. For example, the language information may include words, sentences, and text.

In step 407, the electronic device 120 corrects errors in voice recognition. For example, the errors in voice recognition may be corrected using domain knowledge of the input message by the user 110. Here, the domain knowledge may mean knowledge of the topic or field indicated by the input message. Thus, ambiguous parts of the language information produced by means of voice recognition may be corrected with reference to the domain knowledge.

In step 409, the electronic device 120 determines the language proficiency level of the user 110. For example, the electronic device may collect language information of the user 110 included in the input message through k conversations, and may determine the language proficiency level of the user 110, based on the collected language information. Here, the k conversations may mean the number of times the electronic device 120 outputs a response to the input message of the user 110. In some embodiments, the language information of the user 110 included in the input message may include a predetermined number of words, the number of words, non-overlapping words, and the number of conversations.

In step 411, the electronic device 120 determines the purpose of the input message. That is, the electronic device 120 analyzes the language information of the user 110 included in the input message, and determines the intention of the user 110 indicated by the input message.

In step 413, the electronic device 120 outputs a response for determining the purpose of the input message. If the electronic device 120 fails to determine the intention of the user 110 only by analyzing the currently received input message, the electronic device 120 outputs questions to the user 110 in order to obtain more detailed language information. In some embodiments, if the electronic device 120 determines the intention of the user 110 by analyzing only the currently received input message, step 413 may be omitted.

Figure 5:
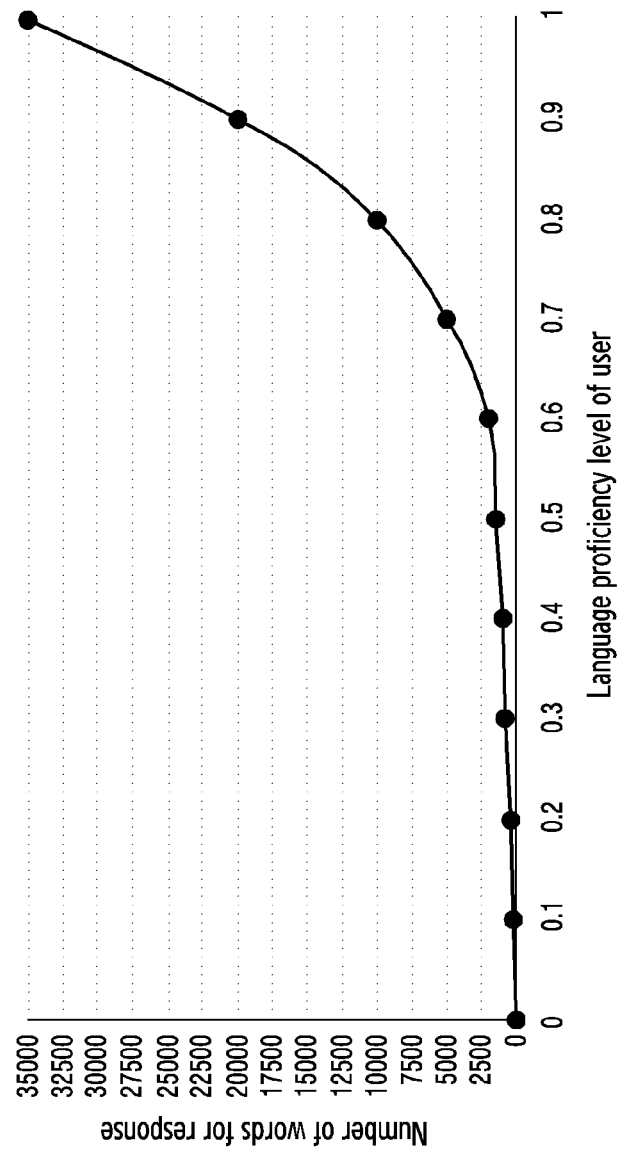
FIG. 5 illustrates an example of a graph representing the number of words for a response according to a language proficiency level of a user in an electronic device according to various embodiments of the disclosure.

In step 415, the electronic device 120 determines language information for a response corresponding to the language proficiency level of the user 110. In this case, the language proficiency level of the user 110 may be represented by a number. Referring to FIG. 5, respective ones of the language proficiency levels of the user 110 may be mapped to the number of words that may be used in the response. For example, if the language proficiency level of the user 110 is 0.7, the electronic device 120 may determine words for a response from among a set of 5000 words. As another example, if the language proficiency level of the user is 0.9, the electronic device 120 may determine words for a response from among a set of 10000 words. That is, as the language proficiency level of the user 110 becomes higher, the electronic device 120 may use a greater variety of expressions for the response.

In some embodiments, respective ones of the language proficiency levels of the user 110 may be mapped to the grammar and lexical forms that may be used in the response. For example, if the user 110 speaks English, the language proficiency levels of the user 110 and the grammar and lexical forms that may be used in the response may be mapped with each other as shown in Table 1 below.

TABLE 1

| Grammar and lexical forms | Language proficiency level | | | | | | |
|---|---|---|---|---|---|---|---|
| | Basic | Upper basic | Intermediate | Upper intermediate | Advanced | Proficient | Native |
| There is/there are, Simple Present, Present Continuous, Sample Past, Future Time (going to), I'd like, Gerunds, Verb + to + infinitive (express purpose), Can/can't, Can/could | ○ | ○ | ○ | ○ | ○ | ○ | ○ |
| Future Time (present continuous), Future Time (will), Present Perfect, Might, may, Must/mustn't, Should, Zero and $1^{st}$ conditional | | ○ | ○ | ○ | ○ | ○ | ○ |
| Simple passive, Must/have to, Need to/needn't, 2nd and 3rd conditional, Past Continuous. | | | ○ | ○ | ○ | ○ | ○ |
| Future Continuous, Future Perfect, Present Perfect Continuous, Wish/if only, All passive forms. Ought to, Should have/might have/etc., Past Perfect, Past Perfect Continous | | | | ○ | ○ | ○ | ○ |
| Future Perfect Continuous, Inversion | | | | | ○ | ○ | ○ |
| Idiomatic Expressions, Advanced linking phrases Advanced phrasal verbs | | | | | | ○ | ○ |

In this case, if the language proficiency level of the user 110 is basic, the electronic device 120 may use grammar and words for a response, such as "There is/there are", Simple Present, Present Continuous, Simple Past, Future Time (going to), "I'd like", Gerunds, Verb+to +infinitive (express purpose), "Can/can't", and "Can/could". In addition, if the language proficiency level of the user 110 is upper basic, the electronic device 120 may use grammar and vocabulary for a response, such as "Future Time (present continuous), Future Time ("will"), Present Perfect, "Might", "may", "Must/mustn't", "Should", and Zero and 1st conditional, as well as the grammar and vocabulary mapped with the basic level. That is, the grammar and vocabularies available for the response are determined according to the language proficiency level of the user 110.

In other embodiments, respective ones of the language proficiency levels of the user 110 may be mapped to UIs that may be used in the response. For example, if the language proficiency level of the user 110 is lower than a threshold value, the electronic device 120 may determine to use moving pictures for the response. As another example, if the language proficiency level of the user 110 is higher than a threshold value, the electronic device 120 may determine a photographic image or a website for the response.

In step 417, the electronic device 120 produces a response using the language information for a response. For example, based on words, grammar, and lexical forms determined according to the language proficiency level of the user 110, the electronic device 120 may produce a sentence.

In step 419, the electronic device 120 outputs a response. For example, the electronic device 120 may output a voice as a response through the speaker 240. As another example, the electronic device 120 may display a UI as a response through the display 230.

Figure 6:
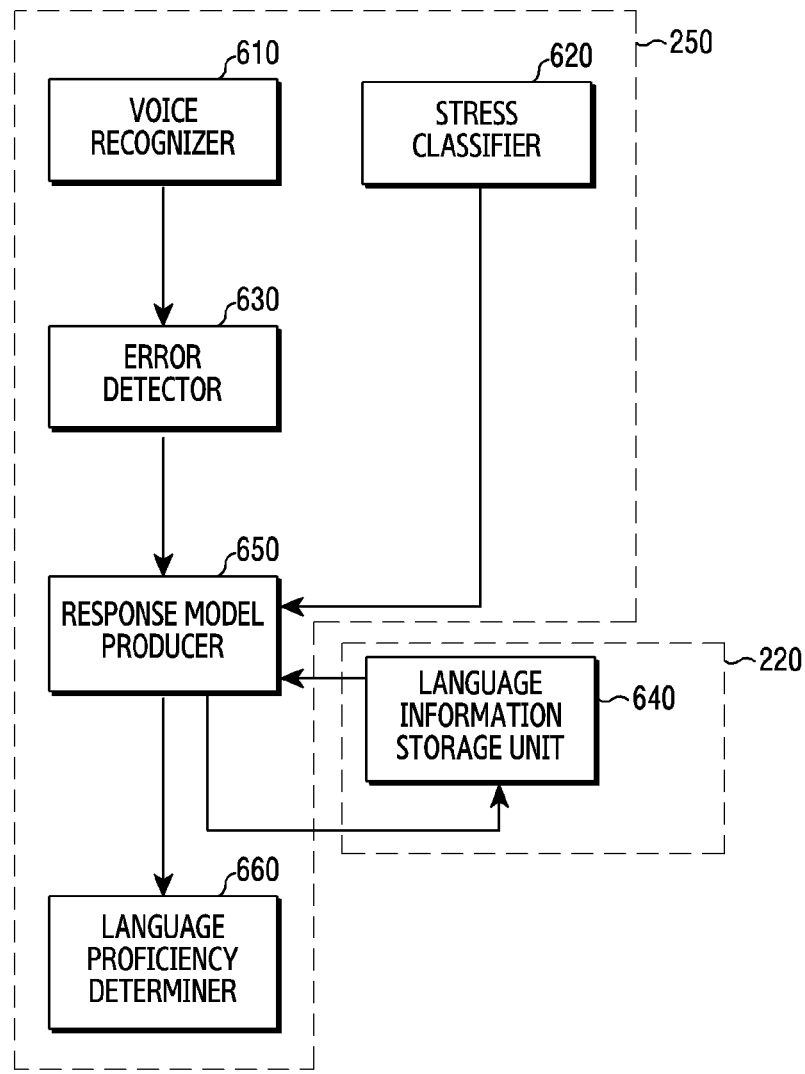
FIG. 6 illustrates interworking between a processor and a memory in order to determine a language proficiency level of a user in an electronic device according to various embodiments of the disclosure.

FIG. 6 illustrates interworking, between a processor and a memory in order to determine a language proficiency level of a user in an electronic device according to various embodiments of the disclosure. FIG. 6 illustrates detailed functional configurations of the processor 260 and the memory 220 and interworking therebetween. It is assumed that the electronic device 120 receives a voice message in FIG. 6.

Referring to FIG. 6, the processor 260 includes a voice recognizer 610, a stress classifier 620, an error detector 630, a response model producer 650, and a language proficiency determiner 660. The memory 220 includes a language information storage unit 640.

The voice recognizer 610 produces text corresponding to a received voice message. The voice recognizer 610 may perform voice recognition on the received voice message, thereby producing text corresponding to the voice message. The voice recognizer 610 transmits the produced text to the error detector 630.

The stress classifier 620 detects the stress of the voice message. In some embodiments, the electronic device 120 may detect the intonation, tone, and rhythm of the voice message. The stress classifier 620 may detect the lengths and the number of intervals in which voice is not included in the voice message.

The error detector 630 detects errors in the text received from the voice recognizer 610. In some embodiments, the errors in the text may be detected based on lemmas, part-of-speech (POS) tags, named-entities, and syntactic features of the words contained in the text. For example, the syntactic features may refer to the relationship between the words contained in the text and the parts of speech thereof. In this case, the relationship between the words and the parts of speech may be expressed in a tree structure. In other embodiments, the error detector 630 may detect words that are not related to the subject or field represented by the text. In addition, the error detector 630 may detect an error in the order of the words included in the text, an error in the order of the parts of speech, and an error in the relationship between the words.

The language information storage unit 640 may include language information of the user 110 included in the input message. In addition, the language information storage unit 640 may include previous language information of the user 110 included in an input message received before the current input message is received. That is, the language information storage unit 640 may update or accumulate the language information of the user 110 as the conversation between the user 110 and the electronic device 120 progresses. The language information storage unit 640 may function as a database for the language information of the user 110.

The response model producer 650 produces a language proficiency model using information on the errors received from the error detector 630, information on the stress received from the stress classifier 620, the previous language information of the user 110 received from the language information storage unit 640, information on the previous language proficiency level and information on the previous language proficiency model of the user 110. Here, the language proficiency model may refer to a function representing the mapping relationship between the language information and the language proficiency levels of the user 110, in some embodiments, the response model producer 650 may assign different weights to respective pieces of the received information, thereby producing a language proficiency model. In other embodiments, as the conversation between the user 110 and the electronic device 120 progresses, the response model producer 650 may further subdivide the language proficiency levels of the language proficiency model. This is due to the fact that the language information of the user 110 accumulated in the language proficiency model is reflected. That is, the response model producer 650 may perform machine learning in order to update the language proficiency model. The machine learning may be referred to as "deep learning", "deep neural networks (DNN)", "long-short-term memory (LSTM)", or any other term having an equivalent technical meaning, depending on their technical meaning. In some embodiments, the response model producer 650 may transmit, to the language information storage 640, the language information of the user 110 and information on the updated language proficiency model.

The language proficiency determiner 660 may determine the language proficiency level of the user 110 using the language proficiency model received from the response model producer 650. Here, the language proficiency level may be in a vector form that is converted into a number.

According to various embodiments described above, the electronic device may provide a response appropriate for the language level of the user. Therefore, the user may more easily understand the response from the electronic device. In the embodiments described above, the electronic device determines the user's language proficiency and determines grammar, the number and types of words, the length of the sentence, and the like according to the user's proficiency. In addition, according to various embodiments, the electronic device may determine vocabulary or the like with which to constitute a response, based on the frequency of use of the language by the user. Hereinafter, an embodiment for configuring language information, based on the frequency of use, will be described with reference to FIG. 7.

Figure 7:
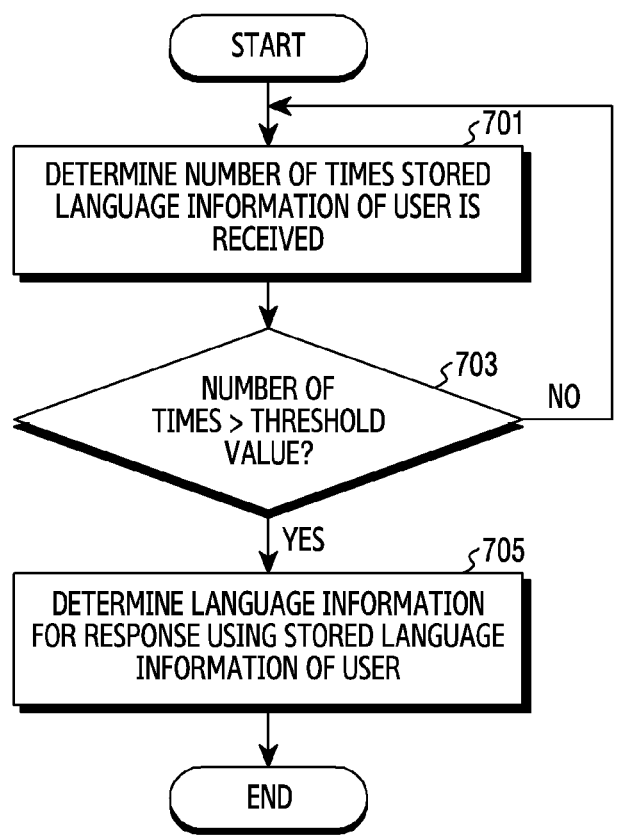
FIG. 7 illustrates an operation method for determining a response using language information frequently used by a user in an electronic device according to various embodiments of the disclosure.

FIG. 7 illustrates an operation method for determining a response using language information frequently used by a user in an electronic device according to various embodiments of the disclosure. FIG. 7 illustrates an operation method of the electronic device 120.

Referring to FIG. 7, in step 701, the electronic device 120 determines the number of times the language information of the user 110 stored in the electronic device 120 is received by the electronic device 120. Since the electronic device 120 stores the language information of the user 110 included in an input message every time the input message is received from the user 110, the electronic device 120 may determine the number of times specific language information of the user 110 is received.

In step 703, the electronic device 120 determines whether or not the number of times the language information of the user 110 stored in the electronic device 120 is received is greater than a threshold value. That is, if the number of times the stored language information of the user 110 is received is greater than the threshold value, it may mean that the user 110 frequently uses the stored language information of the user 110. Conversely, if the number of times the stored language information of the user 110 is received is not greater than the threshold value, it may mean that the user 110 does not frequently use the stored language information of the user 110. If the number of times the language information of the user 110 stored in the electronic device 120 is not greater than the threshold value, the electronic device 120 proceeds to step 701.

On the other hand, if the number of times the language information of the user 110 stored in the electronic device 120 is greater than the threshold value, the electronic device 120 determines language information for a response using the language information of the user 110 stored in the electronic device 120 in step 705. In other words, the electronic device 120 specifies words or phrases that the user frequently uses as candidate words to constitute a response. At this time, the electronic device 120 may set the priority of the frequently used word or phrase to be higher than those of other words or phrases. Accordingly, the user 110 may more clearly understand the response. This is due to the fact that the user 110 can more easily understand the response if the response determined based on the language information for the response includes words or phrases that the user 110 frequently uses.

According to various embodiments described above, the electronic device may provide a response that is optimized for the language level or the frequency of use of language of the user. In addition, according to various embodiments, in addition to selection of words/phrases/vocabulary constituting the response, the electronic device may further determine whether or not to add additional means for the response. Now, an embodiment for providing a response including additional means will be described with reference to FIG. 8.

Figure 8:
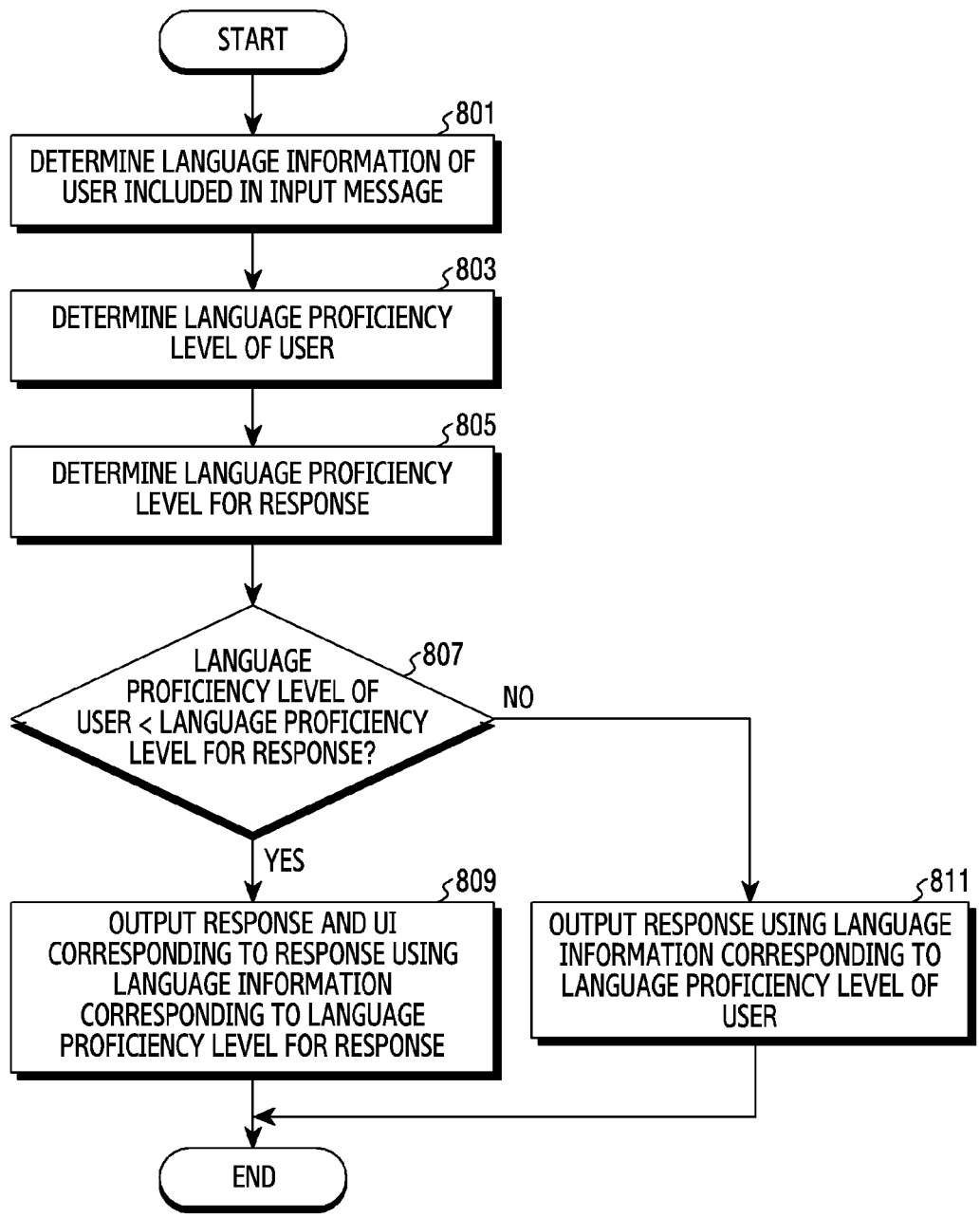
FIG. 8 illustrates an operation method for outputting a response by comparing a language proficiency level of a user with a language proficiency level for a response in an electronic device according to various embodiments of the disclosure.

FIG. 8 illustrates an operation method for outputting a response by comparing a language proficiency level of a user with a language proficiency level for a response in an electronic device according to various embodiments of the disclosure. FIG. 8 illustrates an operation method of the electronic device 120.

Referring to FIG. 8, in step 801, e electronic device 120 determines language information of the user 110 included in an input message. For example, the language information of the user 110 may include information about vocabulary, grammar, word order, intonation, stress, tone and rhythm.

In step 803, the electronic device 120 determines the language proficiency level of the user 110. Here, the language proficiency level of the user 110 may correspond to the language information of the user 110. In some embodiments, the electronic device 120 may determine the language proficiency level of the user 110 according to the number of words included in the language information of the user 110 in k conversations. For example, if the language information of the user 110 includes 2000 words in 100 conversations, the electronic device 120 may determine the language proficiency level of the user 110 to be 0.5. As another example, if the language information of the user 110 includes 3000 words in 100 conversations, the electronic device 120 may determine the language proficiency level of the user 110 to be 0.7. That is, the greater the number of words used by the user 110, the higher the language capability of the user 110 may be determined.

In step 805, the electronic device 120 determines the language proficiency level for a response. Here, the language proficiency level for a response may refer to the language proficiency level corresponding to the language information required for the response. In this case, the language proficiency level for a response may be different from the language proficiency level of the user 110. This is due to the fact that there may be the case where language information mapped to a language proficiency level higher than the language information mapped to the language proficiency level of the user 110 is inevitably used in order to produce a response to the input message of the user 110.

In step 807, the electronic device 120 determines whether or not the language proficiency level for a response is greater than the language proficiency level of the user 110. In some embodiments, the electronic device 120 may determine whether or not the language information mapped to the language proficiency level for a response includes the language information mapped to the language proficiency level of the user 110.

If the language proficiency level for a response is greater than the language proficiency level of the user 110, the electronic device 120 outputs a response and an additional UI corresponding to the response using the language information corresponding to the language proficiency level for a response in step 809. In this case, the UI corresponding to the response may be a UI that allows the user 110 to more easily understand the response. Therefore, even if the user 110 cannot understand the response produced according to the language proficiency level higher than the language proficiency level of the user 110, the user can recognize the meaning of the response with reference to the additional UI corresponding to the response. For example, the additional UI may include a variety of content that may supplement the meaning of the words included in the response, such as moving pictures, graphics, images, sounds, and the like.

On the other hand, if the language proficiency level for a response is not greater than the language proficiency level of the user 110, the electronic device 120 outputs a response using the language information corresponding to the language proficiency level of the user 110 in step 811. This is due to the fact that the user 110 can understand the response even if the UI for the response is not output separately.

In FIG. 8, the electronic device 120 may output a response and the corresponding to the response only in the case where the language proficiency level for a response is greater than the language proficiency level of the user 110, instead of outputting the response and the UI corresponding to the response in all cases, thereby reducing power consumption for the user 110 to understand the response.

The operations based on the language proficiency according to the various embodiments described above may be utilized in various devices and various fields. For example, the techniques described above may be utilized for intelligence agent services of a smartphone, personal assistant services, toys, tourist guide agents, docent services, and the like. Accordingly, the electronic device 120 may operate as follows.

In some embodiments, e elect device 120 may provide personal assistant services. Here, the personal assistant service may be referred to as an "intelligent agent" or any other term having an equivalent technical meaning. The user may perform voice control of various applications (e.g., messenger, phone, gallery, photos, quality assurance (QA), weather forecast, or the like) of the electronic device 120 using the personal assistant service of the electronic device 120. The electronic device 120 may improve the natural language generation (NLG) to adaptively adjust the response to conform to the language level of the user 110. By improving the NLG, communication between the user 110 and the electronic device 120 may be performed more effectively.

In other embodiments, the electronic device 120 may be a toy, a social companion, or a story teller with a child (e.g., the user 120). In this case, the electronic device 120 may determine vocabularies and grammar appropriate for the child, thereby appropriately conducting a conversation with the child. As a result, the child may learn new words according to the mental developmental level, age, and language capability.

In other embodiments, the electronic device 120 may function as a tourist information agent. In this case, the electronic device 120 may conduct a conversation with users 110 (e.g., foreigners or non-native speakers) with various levels of language capability. The electronic device 120 may recognize the intention and requirements of the user 110 in order to determine the language proficiency level of the user 110. In addition, the electronic device 120 may output a response that is easy for the user 110 to understand.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of these may form a memory in which the program is stored. Further, a plurality of such memories may be included in the electronic device.

In addition, the programs may be stored in an attachable storage device which may access the electronic device through communication networks such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details lay be made therein without departing from the scope of the disclosure. Therefore, the scope of the disclosure should not be defined as being limited to the embodiments, but should be defined by the appended claims and equivalents thereof.

The invention claimed is:

1. A method for operating an electronic device, the method comprising:
   receiving an input message;
   determining language information of a user included in the input message;
   determining language information for a response corresponding to the language information of the user; and
   outputting the response, based on the language information for the response,
   wherein determining the language information for the response corresponding to the language information of the user comprises:
      determining a value indicating a language proficiency of the user, based on the language information of the user; and
      determining the language information for the response corresponding to the value indicating the language proficiency of the user, and
   wherein the outputting the response, based on the language information for the response, comprises:
      outputting a response comprised of photographs if the value indicating the language proficiency of the user is a first value; and
      outputting a response comprised of moving pictures if the value indicating the language proficiency of the user is a second value.

2. The method of claim 1, wherein the response is at least one of a sound, text, a photograph, or a moving picture.

3. The method of claim 1, wherein the determining the value indicating the language proficiency of the user, based on the language information of the user, comprises determining the value indicating the language proficiency of the user according to a number of words included in the language information of the user.

4. The method of claim 1, wherein the language information of the user comprises information about at least one of lexicon, grammar, syntax, intonation, stress, tone, and rhythm.

5. The method of claim 1, wherein the determining the language information for the response corresponding to the language information of the user comprises determining the language information for the response, based on other language information of the user included in another input message, which is received before receiving the input message, and the language information of the user.

6. The method of claim 1, wherein the input message is voice or text that is input to the electronic device by the user.

7. The method of claim 1, further comprising:
   detecting an error in the language information of the user.

8. The method of claim 7, wherein determining the language information for a response corresponding to the language information of the user comprises;
   determining the language information for the response, based on the language information of the user and the detected error.

9. An electronic device comprising:
   an input unit; and
   at least one processor, operably coupled to the input unit, wherein the at least one processor is configured to perform control so as to:
      receive an input message;
      determine language information of a user included in the input message;
      determine language information for a response corresponding to the language information of the user;
      outputting the response, based on the language information for the response;
      determine a value indicating a language proficiency of the user, based on the language information of the user;
      determine the language information for the response corresponding to the value indicating the language proficiency of the user;
      output a response comprised of photographs if the value indicating the language proficiency of the user is a first value; and
      output a response comprised of moving pictures if the value indicating the language proficiency of the user is a second value.

10. The electronic device of claim 9, wherein the response is at least one of a sound, text, a photograph, or a moving picture.

11. The electronic device of claim 9, wherein the at least one processor performs control so as to determine the value indicating the language proficiency of the user according to a number of words included in the language information of the user.

12. The electronic device of claim 9, wherein the language information of the user comprises information about at least one of lexicon, grammar, syntax, intonation, stress, tone, and rhythm.

13. The electronic device of claim 9, wherein the at least one processor performs control so as to determine the language information for the response, based on other language information included in another input message, which is received before receiving the input message, and the language information of the user.

14. The electronic device of claim 9, wherein the at least one processor performs control so as to detect an error in the language information of the user.

15. The electronic device of claim 14, wherein the at least one processor performs control so as to determine the language information for the response, based on the language information of the user and the detected error.

16. The electronic device of claim 9, wherein the input message is voice or text that is input to the electronic device by the user.

* * * * *